United States Patent
Kim et al.

(10) Patent No.: US 10,231,027 B2
(45) Date of Patent: Mar. 12, 2019

(54) CONTROL DEVICE AND METHOD OF CONTROLLING BROADCAST RECEIVER

(71) Applicant: SAMSUNG ELECTRONICS CO., LTD., Suwon-si (KR)

(72) Inventors: Joo-youn Kim, Seoul (KR); Yong-hwan Kwon, Seongnam-si (KR); Jung-a Kim, Suwon-si (KR); Bum-jin Lee, Goyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/877,464

(22) Filed: Oct. 7, 2015

(65) Prior Publication Data

US 2016/0029097 A1 Jan. 28, 2016

Related U.S. Application Data

(62) Division of application No. 13/303,534, filed on Nov. 23, 2011, now Pat. No. 9,179,175.

(30) Foreign Application Priority Data

Dec. 31, 2010 (KR) .......................... 10-2010-0140247

(51) Int. Cl.
*H04N 21/81* (2011.01)
*H04N 21/485* (2011.01)
(Continued)

(52) U.S. Cl.
CPC ....... *H04N 21/485* (2013.01); *G06F 3/04817* (2013.01); *G08C 19/28* (2013.01);
(Continued)

(58) Field of Classification Search
CPC ............. H04N 21/485; H04N 21/4126; H04N 21/8186
See application file for complete search history.

(56) References Cited

U.S. PATENT DOCUMENTS

| 6,008,735 A | 12/1999 | Chiloyan et al. |
| 6,791,467 B1 | 9/2004 | Ben-Ze'ev |

(Continued)

FOREIGN PATENT DOCUMENTS

| EP | 1615429 A2 | 1/2006 |
| KR | 10-0453968 B1 | 10/2004 |
| KR | 10-2008-0063309 A | 7/2008 |

OTHER PUBLICATIONS

Communication dated Aug. 6, 2015 issued by European Patent Office in counterpart European Application No. 15166459.6.
(Continued)

*Primary Examiner* — Junior O Mendoza
(74) *Attorney, Agent, or Firm* — Sughrue Mion, PLLC

(57) ABSTRACT

A control device is provided. The control device includes a user interface unit in which information of a broadcast receiver controlled through unidirectional wireless communication is entered, a searching unit which searches an infrared (IR) code set corresponding the broadcast receiver based on the entered information, a managing unit which registers the broadcast receiver as a controllable broadcast receiver within a home network based on the searched IR code set, and a first communication interface unit which, if a control signal for the registered broadcast receiver is received, transmits an IR code corresponding to the control signal from the IR code set corresponding to the registered broadcast receiver to the registered broadcasting receiver.

18 Claims, 11 Drawing Sheets

(51) Int. Cl.
*G08C 19/28* (2006.01)
*H04N 21/41* (2011.01)
*H04N 21/422* (2011.01)
*H04N 21/462* (2011.01)
*H04N 21/6547* (2011.01)
*G06F 3/0481* (2013.01)
*H04N 5/44* (2011.01)

(52) U.S. Cl.
CPC ....... *H04N 5/4403* (2013.01); *H04N 21/4126* (2013.01); *H04N 21/42207* (2013.01); *H04N 21/42221* (2013.01); *H04N 21/42225* (2013.01); *H04N 21/42226* (2013.01); *H04N 21/4622* (2013.01); *H04N 21/6547* (2013.01); *H04N 21/42209* (2013.01); *H04N 2005/4426* (2013.01)

(56) References Cited

U.S. PATENT DOCUMENTS

| | | | |
|---|---|---|---|
| 6,909,378 B1 * | 6/2005 | Lambrechts | G06F 3/0238 340/12.25 |
| 7,091,898 B2 | 8/2006 | Arling et al. | |
| 8,132,105 B1 * | 3/2012 | Dubil | G08C 19/28 715/716 |
| 2003/0103088 A1 * | 6/2003 | Dresti | G06F 3/0481 715/835 |
| 2003/0151538 A1 * | 8/2003 | Escobosa | G06F 8/65 341/176 |
| 2004/0169590 A1 | 9/2004 | Haughawout et al. | |
| 2004/0215816 A1 * | 10/2004 | Hayes | H04L 12/2803 709/238 |
| 2005/0005288 A1 * | 1/2005 | Novak | H04N 5/4403 725/32 |
| 2005/0108751 A1 | 5/2005 | Dacosta | |
| 2006/0007015 A1 | 1/2006 | Krzyzanowski et al. | |
| 2006/0187079 A1 * | 8/2006 | Stevenson | G08C 19/28 340/4.3 |
| 2006/0200538 A1 * | 9/2006 | Yuh | G06F 8/65 709/219 |
| 2008/0165153 A1 * | 7/2008 | Platzer | G06F 1/1626 345/173 |
| 2008/0178224 A1 | 7/2008 | Laude et al. | |
| 2008/0247757 A1 | 10/2008 | Um et al. | |
| 2009/0058708 A1 | 3/2009 | Park et al. | |
| 2009/0156251 A1 | 6/2009 | Cannistraro et al. | |
| 2009/0239587 A1 * | 9/2009 | Negron | G06F 3/04883 455/566 |
| 2010/0157171 A1 * | 6/2010 | Hayes | G08C 17/02 348/734 |
| 2011/0035773 A1 | 2/2011 | Stecyk et al. | |
| 2012/0041925 A1 * | 2/2012 | Pope | G06F 3/0486 707/626 |
| 2015/0042460 A1 * | 2/2015 | Mui | G08C 19/00 340/12.31 |

OTHER PUBLICATIONS

Communication from the European Patent Office dated Jan. 5, 2015 in a counterpart European Application No. 11194111.8.
Communication dated Jul. 16, 2014 issued by the European Patent Office in counterpart European Patent Application No. 11194111.8.
Communication dated Mar. 28, 2012 issued by the European Patent Office in European Application No. 11194111.8.
Office Action issued in parent U.S. Appl. No. 13/303,534, dated Jan. 4, 2013.
Office Action issued in parent U.S. Appl. No. 13/303,534, dated Apr. 26, 2013.
Office Action issued in parent U.S. Appl. No. 13/303,534, dated Oct. 9, 2013.
Office Action issued in parent U.S. Appl. No. 13/303,534, dated Feb. 7, 2014.
Office Action issued in parent U.S. Appl. No. 13/303,534, dated May 21, 2014.
Office Action issued in parent U.S. Appl. No. 13/303,534, dated Sep. 5, 2014.
Notice of Allowance issued in parent U.S. Appl. No. 13/303,534, dated Jun. 24, 2015.
Communication dated Jul. 20, 2016 issued by European Patent Office in counterpart European Patent Application No. 15 166 459.6.
Communication dated Oct. 17, 2016 issued by Korean Intellectual Property Office in counterpart Korean Application No. 10-2010-0140247.
Communication dated Mar. 14, 2017, issued by the European Patent Office in counterpart European application No. 15166459.6.
Communication dated Jan. 26, 2018 in corresponding European Patent Application No. 15166459.6.

* cited by examiner

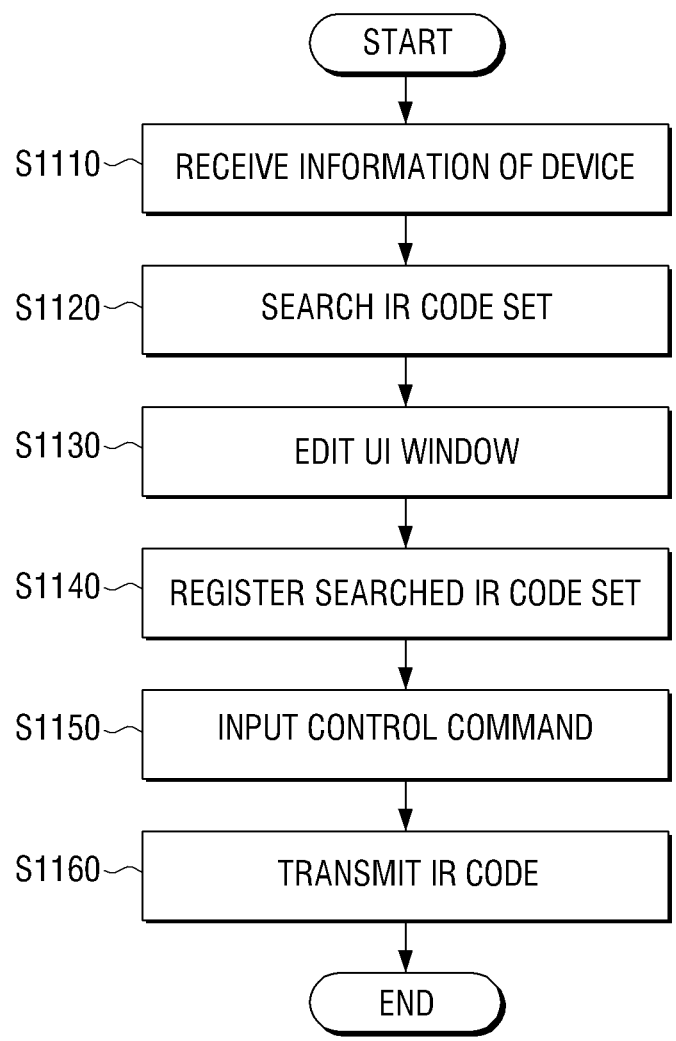

CONTROL DEVICE AND METHOD OF CONTROLLING BROADCAST RECEIVER

CROSS-REFERENCE TO RELATED APPLICATION

This is a divisional of U.S. application Ser. No. 13/303,534 filed Nov. 23, 2011, which claims priority from Korean Patent Application No. 10-2010-0140247, filed on Dec. 31, 2010, in the Korean Intellectual Property Office, the disclosures of which are incorporated herein by reference in their entirety.

BACKGROUND

1. Field

Apparatuses consistent with exemplary embodiments relate to a control device and a method of controlling a broadcast receiver, and more particularly, to a control device and a method of controlling a broadcast receiver in which the control device is easily set for controlling a new broadcast receiver in a home network.

2. Description of the Related Art

Broadcast receivers, are devices capable of receiving a digital satellite broadcast signal and video and/or audio signals from various types of external devices such as a video player, a digital video disc (DVD) player or a blu-ray disc player and converting the signals into a transport stream (TS) signal and displaying the converted TS signal or transmitting the converted TS signal to an external display device. Typical broadcast receivers include an Internet protocol television (IPTV) such as a digital TV or a video on demand (VOD) player and a set top box (STB). Such broadcast receivers are usually controlled by a dedicated control device such as a remote controller.

Recently, since the number of devices connectable to a home network is increased, a universal remote controller capable of controlling the various devices is often used.

In the related art, when a new device, such as a broadcast receiver, is registered in such an universal remote controller, a complicated process for registering the new device on the universal remote controller is required. Such registration requires looking for a code set corresponding to the new broadcast receiver using a personal computer (PC) program, performing a test to verify that the universal remote controller controls the broadcast receiver, and recording the code in the universal remote controller.

In the related art, since the PC program has to be used, the new broadcast receiver can not be registered without a PC. In addition, even if there is a PC, it is uncomfortable to install and access a PC program.

However, the conventional universal remote controller does not manage code sets for each manufacturer and each model, therefore making it uncomfortable for a user to determine the code set for the new broadcast receiver. In addition, since the conventional universal remote controller supports a general code set for a broadcast receiver, it is impossible to support a special function supported only in a special broadcast receiver.

SUMMARY

One or more exemplary embodiments may overcome the above disadvantages and/or other disadvantages not described above. However, it is understood that one or more exemplary embodiments are not required to overcome the disadvantages described above, and may not overcome any of the problems described above.

One or more exemplary embodiments provide a control device and a method of controlling a broadcast receiver using the control device. The control device can be easily set to control a new broadcast receiver in a home network.

According to an aspect of an exemplary embodiment, there is provided a control device. The control device may include: a user interface unit which receives information of a broadcast receiver, a searching unit which searches an infrared (IR) code set corresponding to the broadcast receiver based on the received information, a managing unit which registers the broadcast receiver as a controllable broadcast receiver based on the searched IR code set, and a first communication interface unit which, if a control signal of the registered broadcast receiver is received, transmits an IR code corresponding to the control signal from the IR code set corresponding to the registered broadcast receiver to the registered broadcasting receiver.

The user interface unit may generate a user interface window including at least one of a first region for displaying and selecting a type of broadcast receiver, a second region for displaying and selecting a manufacturer of the broadcast receiver and a third region for displaying and selecting a model of the broadcast receiver.

The control device may further include a storage unit which stores a user interface window corresponding to the registered broadcast receiver and a control unit which controls the user interface unit to display the user interface window corresponding to the registered broadcast receiver.

The user interface window may display a plurality of icons corresponding to a plurality of control signals of the registered broadcast receiver.

The user interface unit may receive an edit command for the user interface window and the managing unit may store the user interface window edited by the received edit command in the storage unit as a user interface window corresponding to the broadcast receiver.

The user interface unit may perform adding, changing and changing an order of an icon in the user interface window and the managing unit may store the changed user interface window as the user interface window corresponding to the broadcast receiver.

The control device may further include a second communication interface unit which requests menu information corresponding to the broadcast receiver and receives the menu information. The user interface unit may display the user interface window corresponding to the registered broadcast receiver along with the received menu information.

The menu information may include at least one of current channel information, a current volume, a playing time, a remaining reproducing time, a current time and an electronic program guide (EPG).

The control device may further include a storage unit which stores a plurality of IR code sets for each broadcast receiver. The searching unit may search an IR code set among the plurality of IR code sets stored in the storage unit corresponding to the received information.

The control device may further include a second communication interface unit which communicates with an external server through bidirectional wireless communication. The searching unit may control the second communication interface unit to receive the IR code set corresponding to the received information from the external server.

The searching unit may search a recognizable IR code of the broadcast receiver in response to the broadcast receiver, thereby searching the IR code set.

According to an aspect of another exemplary embodiment, there is provided a method of controlling a broadcasting receiver. The method may include: receiving information of a broadcast, searching an infrared (IR) code set corresponding to the broadcast receiver based on the received information, registering the broadcast receiver as a controllable broadcast based on the searched IR code set, receiving a control command of the registered broadcast receiver, and transmitting an IR code corresponding to the control command from the IR code set corresponding to the registered broadcast receiver to the registered broadcast receiver.

The receiving information may include receiving the information by generating a user interface window including at least one of a first region displaying a type of broadcast receiver, a second region displaying a manufacturer of the broadcast receiver and a third region displaying a model of the broadcast receiver.

The method may further include displaying a user interface window previously stored corresponding to the registered broadcast receiver.

The user interface window may display a plurality of icons corresponding to a plurality of control signals of the registered broadcast receiver.

The method may further include receiving an edit command for the user interface window. The registering the broadcasting receiver may include registering the user interface window edited by the received edit command as a user interface window corresponding to the broadcast receiver.

The method may further include requesting menu information corresponding to the broadcast receiver and receiving the menu information through bidirectional wireless communication. The displaying the user interface window may include displaying the user interface window corresponding to the registered broadcast receiver along with the received menu information.

The menu information may include at least one of current channel information, a current volume, a playing time, a remaining reproducing time, a current time and an electronic program guide (EPG).

The searching an IR code set may include searching an IR code set corresponding to the received information among a plurality of code sets for each broadcast receiver previously stored.

The searching an IR code set may include transmitting the received information to an external server through bidirectional wireless communication and receiving an IR code set corresponding to the received information.

The searching an IR code set may include transmitting a plurality of IR codes to the broadcast receiver using unidirectional wireless communication, checking an IR code recognizable by the broadcast receiver in response to the broadcast receiver, and searching the checked IR code as the IR code set of the broadcast receiver.

Additional aspects and advantages of the exemplary embodiments will be set forth in the detailed description, will be obvious from the detailed description, or may be learned by practicing the exemplary embodiments.

BRIEF DESCRIPTION OF THE DRAWINGS

The above and/or other aspects will be more apparent by describing in detail exemplary embodiments, with reference to the accompanying drawings, in which:

FIG. 11 is a flow chart illustrating a method of controlling a broadcast receiver according to an exemplary embodiment.

DETAILED DESCRIPTION OF THE EXEMPLARY EMBODIMENTS

Figure 1:
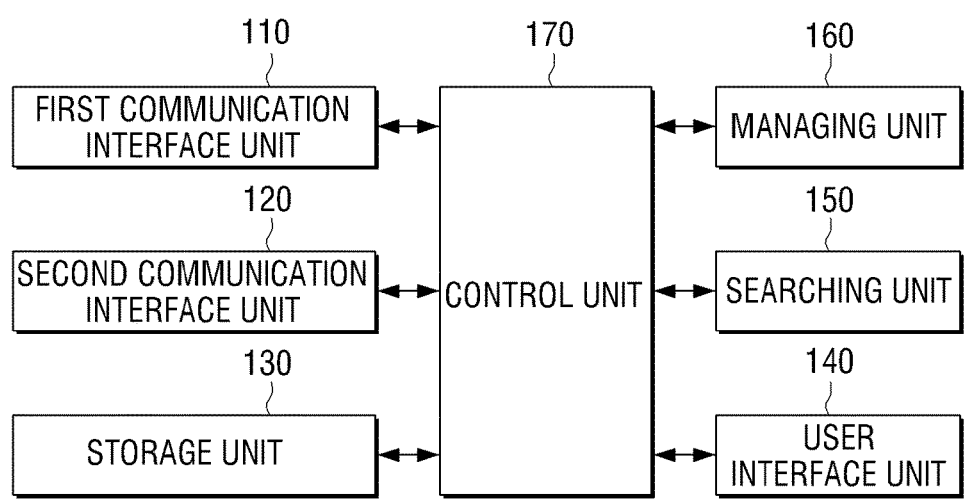
FIG. 1 is a block diagram illustrating a configuration of a control device according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a block diagram illustrating a control device according to an exemplary embodiment.

Referring to FIG. 1, the control device 100 includes a first communication interface unit 110, a second communication interface unit 120, a storage unit 130, a user interface unit 140, a searching unit 150, a managing unit 160 and a control unit 170.

The first communication interface unit 110 transmits a control command through unidirectional wireless communication. Specifically, the first communication interface unit 110 may transmit an infrared (IR) code from an IR code set of a broadcast receiver, which is managed by the managing unit 160 to be described later, corresponding to a control command of a user. Here, the unidirectional wireless communication may include all current communication technologies such as an IR data association and all future unidirectional wireless technologies.

The second communication interface unit 120 transmits a control command through bidirectional wireless communication. Specifically, the second communication interface unit 120 may form a link for performing bidirectional wireless communication with a broadcast receiver in a home network and transmit the control command received from a user through the formed link. Here, the bidirectional wireless communication may include all current communication technologies such as Bluetooth (BT), radio frequency (RF), wireless fidelity (Wi-Fi), high definition multimedia interface consumer electronics control (HDMI-CEC), or wireless HDMI-CEC and all future bidirectional wireless communication technologies.

The second interface unit 120 may request menu information from a broadcasting receiver in a home network and receive the requested menu information from the broadcast receiver. Specifically, the second communication interface unit 120 may receive menu information from a broadcast receiver (For example, a television (TV) or a set top box (STB)) or an external server which provides menu information such as channel information, a current volume, a playing time, a remaining reproducing time, a current time, an electronic program guide (EPG). The menu information may be received from one broadcast receiver or from a plurality of broadcast receivers. For example, the second communication interface unit 120 receives information such as channel information from a first broadcast receiver 10-1 and information such as EPG information for each channel from a second broadcast receiver 10-2. Information received from other broadcast receivers may be merged and the merged information may be displayed on the user interface unit 140. This will be described later with reference to FIGS. 9 and 10.

The second communication interface 120 may receive an IR code set of a new broadcast receiver. Specifically, the second communication interface unit 120 may transmit information of the broadcast receiver, received from the user interface unit 140 to be described later, to an external server (not shown) and receive an IR code set corresponding to the transmitted information of the broadcast receiver from the external server. At this time, the second communication interface unit 120 may directly receive the IR code set from the external server (for example, when the second communication interface is connectable to the Internet) or receive the IR code set from a broadcast receiver connectable to the external server of a home network. Here, the IR code set includes the control command receivable from the broadcast receiver and the IR codes corresponding to the control command. In the above-described exemplary embodiment, the IR code set corresponding to each specific broadcast receiver is used, but not all control commands supported by the corresponding broadcast receiver are used.

The storage unit 130 stores a plurality of IR code sets of each broadcast receiver. The storage unit 130 stores a plurality of IR code sets which are classified by the type of broadcast receiver and a manufacturer and model of the broadcast receiver in a database (DB) manner. The storage unit 130 may be a storage medium within the control device 100, an external storage medium, for example, a removable disk including a universal serial bus (USB) memory and a web server through a network, or the like.

The storage unit 130 stores menu information. Specifically, the storage unit 130 stores the menu information received through the second communication interface unit 120. When the menu information received through the second communication interface unit 120 is received from a plurality of broadcast receivers, the storage unit 130 may merge the received pieces of menu information into one piece of information. For example, when channel information is received from a TV and EPG information is received through a STB, the received information is stored so that the received EPG information corresponds to each received channel information.

The storage unit 130 stores IR code set information corresponding to each broadcast receiver and user interface windows corresponding to each broadcast receiver. The previously stored IR code set information and the user interface window may be edited by the managing unit 160 which is to be described later.

In the user interface unit 140 information of a broadcast receiver (that is, a new broadcast receiver) controlled through unidirectional wireless communication can be entered and displayed. Specifically, the user interface unit 140 includes a plurality of function keys which allow the user to set or select various functions supported by the broadcast receiver 10 and may display a user interface (UI) window for displaying information of a broadcast receiver. Alternatively, the user interface unit 140 may be a device which can input and an output data simultaneously such as a touch panel or a device in which the keypad and a display device are combined. Thereby, the user can easily input information of a new broadcast receiver to be controlled using the displayed user interface window. The displayed user interface window will be described later with reference to FIGS. 4 to 6.

The user interface unit 140 may include a user interface window to select information of a new broadcast receiver to be set. Specifically, a broadcast receiver may include a plurality of control commands and the user interface window may display a plurality of icons corresponding to the plurality of control commands recognizable by the new broadcast receiver. Thus, the user interface unit 140 may display icons corresponding to each control command recognizable by the new broadcast receiver to be set and may display an order of the corresponding icons to be set. A graphic user interface of the generated user interface window may be stored in the storage unit 130 as a user interface window for the new broadcast receiver.

In the user interface unit 140 an edit command of the user interface window previously stored may be input. Specifically, the user interface unit 140 may receive a command for changing an arrangement order for the plurality of icons, a command for removing an icon previously included, a command for adding an icon corresponding to a new control command, or the like. Thereby, the user interface window of the broadcast receiver previously stored may be updated an edited and the edited user interface window may be stored in the storage unit 130.

The user interface unit 140 may display different interface windows for each broadcast receiver. Specifically, the user interface unit 140 may allow a user to select a broadcast receiver from a plurality of controllable broadcast receivers and extract and display a user interface window corresponding to the selected broadcast receiver from the storage unit 130.

The user interface unit 140 displays the received menu information. Specifically, the user interface unit 140 may display a user interface window corresponding to the broadcast receiver along with the received menu information. For example, when a user currently controls a broadcast receiver (TV), the user interface unit 140 may display a user interface window for channel manipulation along with the corresponding channel information. When the menu information is received from the plurality of broadcast receivers through the second communication interface unit 120, the user interface unit 140 may merge and display the received menu information. For example, when channel information is received from a TV and EPG information is received from a STB, the user interface unit 140 may display the channel information displayable by the broadcast receiver along with the EPG information corresponding to the corresponding channel.

The searching unit 150 searches an IR code set corresponding to a new broadcast receiver based on information corresponding to the new broadcast receiver input in the user interface unit 140. Specifically, the searching unit 150 may search an IR code set corresponding to the new broadcast receiver among the IR code sets previously stored in the storage unit 130 according to the input information in the user interface unit 140. On the other hand, when an IR code set corresponding to the new broadcast receiver is not stored in the storage unit 130, the searching unit 150 may control the second communication interface unit 120 to transmit the information to an external server so that the searching unit 150 may search the IR code set for the new broadcast receiver from the external server.

On the other hand, the searching unit 150 may search an IR code set for a new broadcast receiver through learning. Specifically, the searching unit 150 may control the first communication interface unit 110 to transmit a specific IR code to the new broadcast receiver, classify the transmitted IR code into a recognizable IR code when the new broadcast receiver responds, and search an IR code set for a new broadcast by repeatedly performing the above-described operation for the plurality of IR codes.

The managing unit 160 registers the new broadcast receiver as a controllable broadcast receiver within a home network based on the searched IR code set. Specifically, the managing unit 160 manages the broadcast receiver controllable by the control device 100, the IR code sets for each broadcast receiver, information for a user interface window of each broadcast receiver in a DB. The managing unit 160 may add the IR code set and user interface window information of the new broadcast receiver to the DB. The managing unit 160 may edit the IR code set and user interface window information previously stored according to an edit command of a user.

The control unit 170 controls each configuration of the control device 100. Specifically, the control unit 170 may control the user interface unit 140 to display a user interface window for selecting information for a new broadcast receiver according to an add command of a user for a new broadcast receiver and, when information for a new broadcast receiver is selected through the corresponding user interface window, control the searching unit 150 to search the IR code set according to the selected information for a broadcast receiver.

When the IR code set for the new broadcast receiver is in the searching unit 150, the control unit 170 may control the user interface unit 140 to display a user interface window of the new broadcast receiver and control the managing unit 160 to register the new broadcast receiver as a broadcast receiver controllable by the control device 100.

The control unit 170 controls the user interface unit 140 to display the user interface window corresponding to the broadcast receiver to be controlled by a user and, when a control command is received through the displayed user interface window, controls the first communication interface unit 110 to transmit an IR code corresponding to the received control command.

Thereby, in the control device 100 according to an exemplary embodiment, a new broadcasting receiver is registered as a controllable broadcast receiver only by inputting simple information of the new broadcast receiver thereby improving user convenience.

In addition, in the control device 100, information received from a plurality of broadcasting receivers is merged and the merged information is provided to a user improving user convenience.

In FIG. 1, the control device 100 is illustrated to control all broadcast receivers within a home network through unidirectional wireless communication, but the control device 100 can control the broadcast receiver through bidirectional wireless communication.

Figure 2:
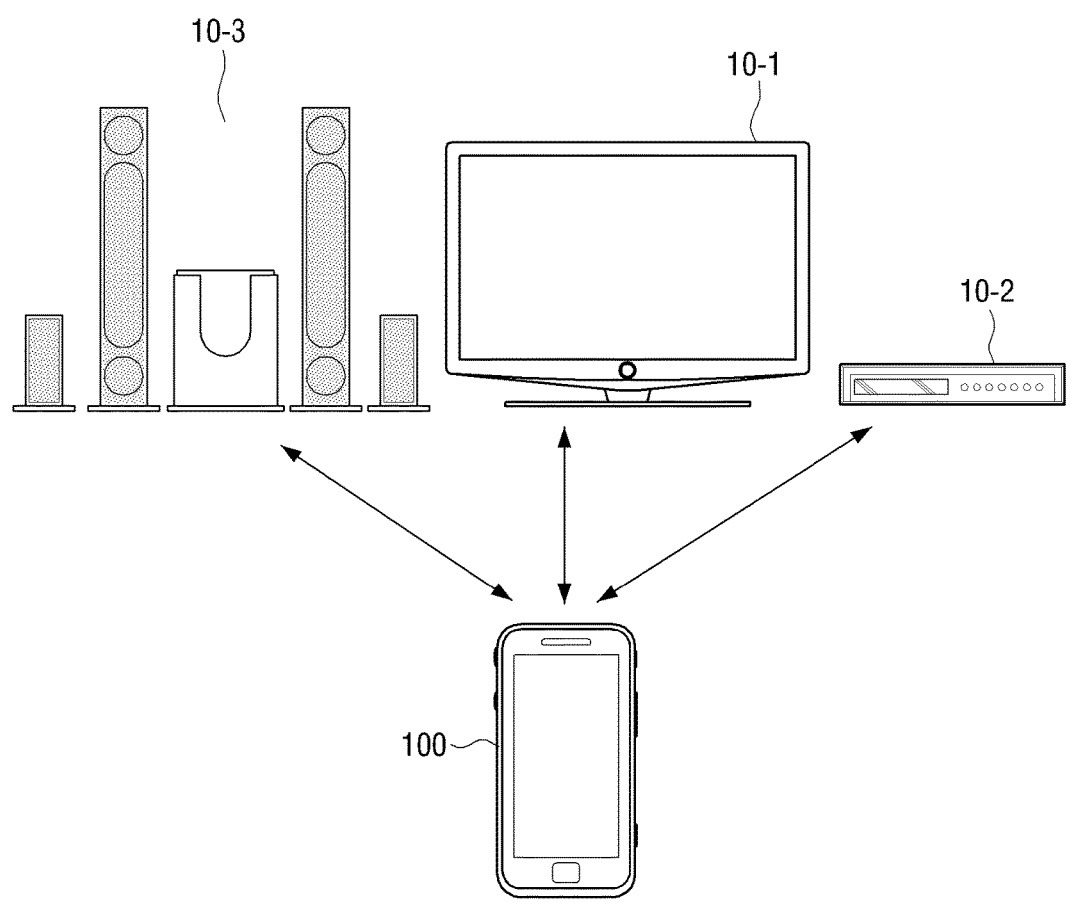
FIG. 2 is a view illustrating a configuration of a home network system including the control device of FIG. 1 according to an exemplary embodiment.

FIG. 2 is a view illustrating a configuration of a home network system including the control device of FIG. 1.

Referring to FIG. 2, the control device 100 of FIG. 1 includes a remote controller and may perform bidirectional wireless communication and/or unidirectional wireless communication with a plurality of broadcast receivers of a home network, that is, a television (TV) 10-1, a set top box (STB) 10-2 and a home theater system (HTS) 10-3.

Figure 4:
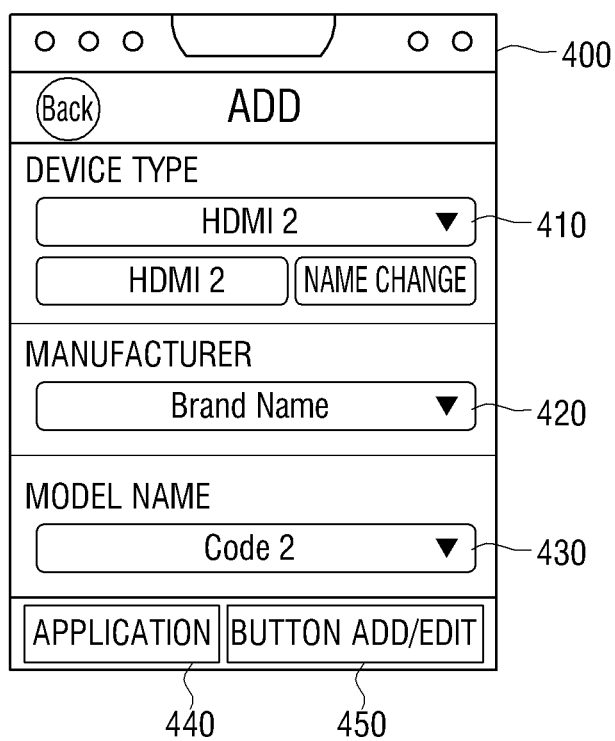
FIGS. 4 to 10 are views illustrating various examples of a user interface window of a control device according to an exemplary embodiment.

If the HTS 10-3 is a new broadcast receiver, the control device 100 may display a user interface window for receiving information of the new broadcast receiver 10-3 from a user as shown in FIG. 4. If the user enters the information for the new broadcast receiver 10-3 through a user interface window, the control device 100 searches an IR code set corresponding to the new broadcast receiver 10-3 in a previously stored database (DB) and registers the searched IR code set, thereby controlling for the new broadcast receiver 10-3.

In FIG. 2, the control device 100 directly controls the plurality of broadcast receivers, but the control device 100 may be configured to be connected to a bidirectional-wireless communication to communicate with the TV 10-1 and to control the STB 10-2 and the HTS 10-3 by the TV 10-1.

In addition, in FIG. 2, three broadcast receivers included in the home network system are illustrated, but this is only one exemplary embodiment and the number of broadcast receivers connectable within the home network system is not limited thereto. The exemplary embodiment illustrates the control device 100 controlling only a broadcast receiver, but the exemplary embodiments may be applied to a device capable of performing bidirectional wireless communication and/or unidirectional communication other than the broadcast receiver.

Figure 3:
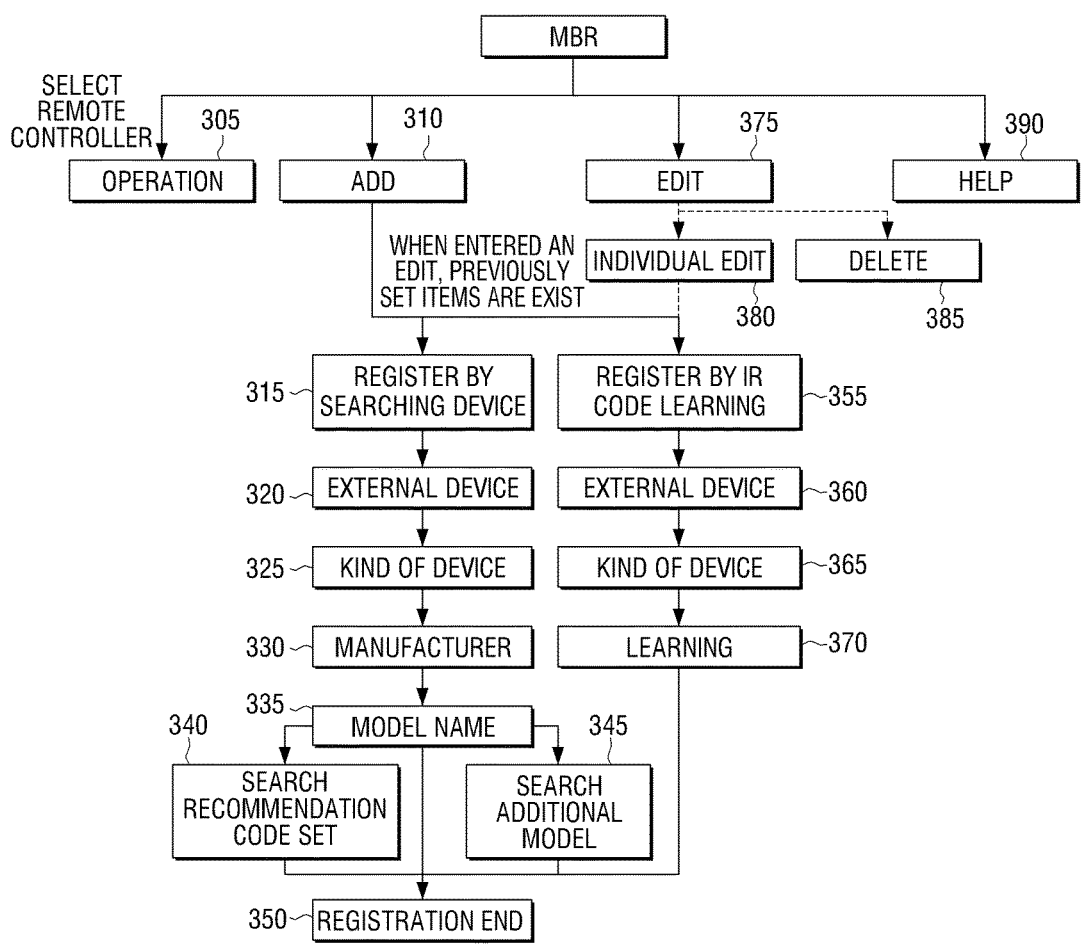
FIG. 3 is a view illustrating an operation of registering a new broadcast receiver according to an exemplary embodiment.

FIG. 3 is a view illustrating an operation of registering a new broadcast receiver according to an exemplary embodiment.

Referring to FIG. 3, the control device 100 may perform an operation 305 of receiving a control command, an operation 310 of adding a new broadcast receiver, an operation 375 of editing the previously registered broadcast receiver, and an operation 390 of providing "HELP" for the control device 100.

The operation 305 of receiving the control command is an operation for controlling a previously registered broadcast receiver. Specifically, if a user interface window corresponding to a broadcast receiver to be controlled is displayed and a user inputs a control command through the user interface window, the control device 100 transmits an IR code corresponding to the input control command to the corresponding broadcast receiver through a unidirectional wireless communication scheme, thereby controlling the corresponding broadcast receiver.

The operation 310 of adding the new broadcast receiver is an operation for registering a newly added broadcast receiver to the home network system through the control device 100. The operation 310 of adding the new broadcast receiver may be performed by two operations. In the first operation, the new broadcast receiver is registered by searching for the broadcast receiver in a DB (operation 315). In the second operation, operation 355, the new broadcast receiver is registered through an IR code learning process.

Operation 315, for registering the new broadcast receiver by searching a DB, may include inputting information related to the new broadcast receiver in a user interface unit 140. For example, a type of external broadcast receiver 320, a type of a new broadcast receiver 325, a manufacturer of the broadcast receiver 330 and a model name of the broadcast receiver 335 may be input into the user interface window 140. Operation 340 may include searching a corresponding IR code set according to the input broadcast receiver information, and operation 350 may include registering the IR code set for the new broadcast receiver. If the IR code set corresponding to the input broadcast receiver information is not in the DB of the control device 100, the control device 100 searches the IR code set corresponding to the new broadcast receiver through an external server, receives the IR code set for the new broadcast receiver from the external server and registers the IR code set for the new broadcast receiver (operation 350).

Operation 355 of registering a broadcast receiver by IR code learning includes selecting an external broadcast receiver 360 and the kind of the broadcast receiver, sequentially checking and setting IR codes transmitted to the broadcast receiver for each of the plurality of control commands (operation 370), thereby registering the IR code set.

The operation 375 of editing the previously registered broadcast receiver includes receiving a user editing command for the previously registered broadcast within the control device 100. The operation 375 of editing the previously registered broadcast receiver includes an operation 385 of removing the IR code set for the previously registered broadcast receiver and an operation 380 of editing the previously registered IR code set. The operation 380 of editing the previously registered IR code set is similar to the operation 355 of registering the broadcast receiver through the IR code learning.

FIGS. 4 to 10 are views illustrating various examples of a user interface window displayable in the control device 100 according to an exemplary embodiment.

Figure 5:
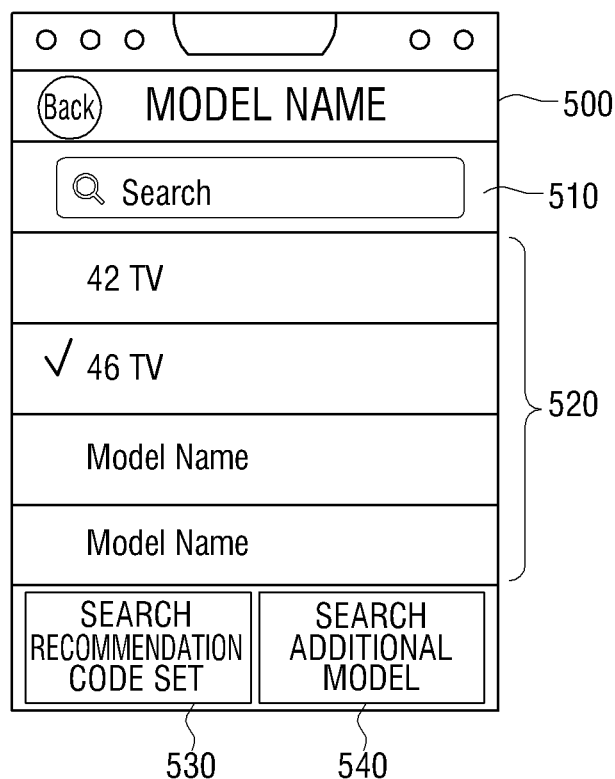
Figure 6:
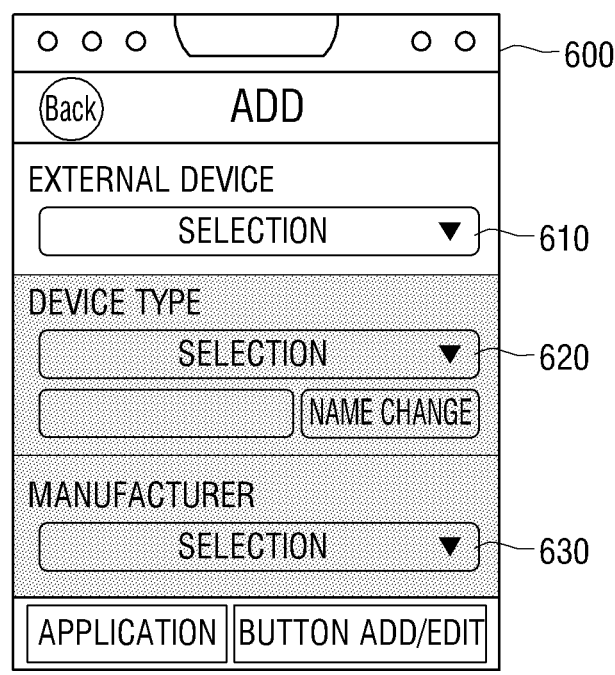

Specifically, FIGS. 4 to 6 are views illustrating examples of a user interface window for entering information of a new broadcast receiver from a user.

Referring to FIG. 4, the user interface window 400 includes a first region 410 for displaying and selecting a type of broadcast receiver, a second region 420 for displaying and selecting a manufacturer of the broadcast receiver, a third region 430 for displaying and selecting a model name of the broadcast receiver, an "application" region 440 and a "button add/edit" region 450.

The first region 410 is a region for selecting the type of broadcast receiver such as a TV, a video tape recorder (VTR), a STB from a user. The second region 420 is a region for selecting the manufacturer of the broadcast receiver.

The third region 430 is a region for selecting the model name of the broadcast receiver. If a user selects the third region 430, the third region 430 may be configured to directly receive the model name of the broadcast receiver through a user interface window as shown in FIG. 5 or display a plurality of model names according to previously input information for the types and manufacturers of broadcast receivers and select one of the model names.

If a user inputs or selects information of a new broadcasting receiver in the first to third regions and selects the "application" region 440, the control device 100 displays a search result corresponding to the input information as shown in FIG. 5.

If a user selects the "button add/edit" region 450, the control device 00 may set a user interface window corresponding to the newly added broadcast receiver.

Referring to FIG. 5, the user interface window 500 includes a region 510 for selecting or inputting a model name, a region 520 which displays a search result, a region 530 in which "recommendation code set search" is selected and a region 540 in which "additional model search" is selected.

The region 510 is used for entering or searching the model name of a new broadcast receiver.

The region displaying the search result is a region which displays a search result corresponding to the model name input in the region 510.

A new broadcast receiver to be added by a user is displayed in the search result, and the user selects one of the searched broadcast receivers before performing the next operation.

On the other hand, if the new broadcast receiver to be added is not in the search result, the user may select the region 540 in which the "additional model search" is selected. At this time, the control device 100 may provide information for the new broadcast receiver from an external server and search an IR code set for the new broadcasting receiver.

Referring to FIG. 6, the user interface window 600 includes a region 610 for selecting an external broadcast receiver, a region 620 for selecting a type of broadcast receiver, a region 630 for selecting a manufacturer of the broadcast receiver, an "application" region 640 and a "button add/edit" region 650.

The region 610 is used for selecting the external broadcast receiver connected to the new broadcast receiver. For example, if the new broadcast receiver is a TV and the previously set external broadcast receiver is a STB, the user may input a STB in the region 610 in which the kind of external broadcast receiver is selected. While the input is exist, the control device 100 may sense the change of connection, if a TV is not connected to a STB but to an Internet protocol television (IPTV) later, and perform an operation corresponding to the change of the connection (for example, operation of registering a new broadcast receiver or an operation of providing another user interface window).

The region 620 receiving the kind of broadcast receiver, the region 630 receiving the manufacturer, the "application" region 640 and the "button add/edit" region 650 are the same as region 410 receiving the kind of broadcast receiver, the region 420 receiving the manufacturer, the "application" region 440 and the "button add/edit" region 450 and thus its repeated description will be omitted.

Figure 7:
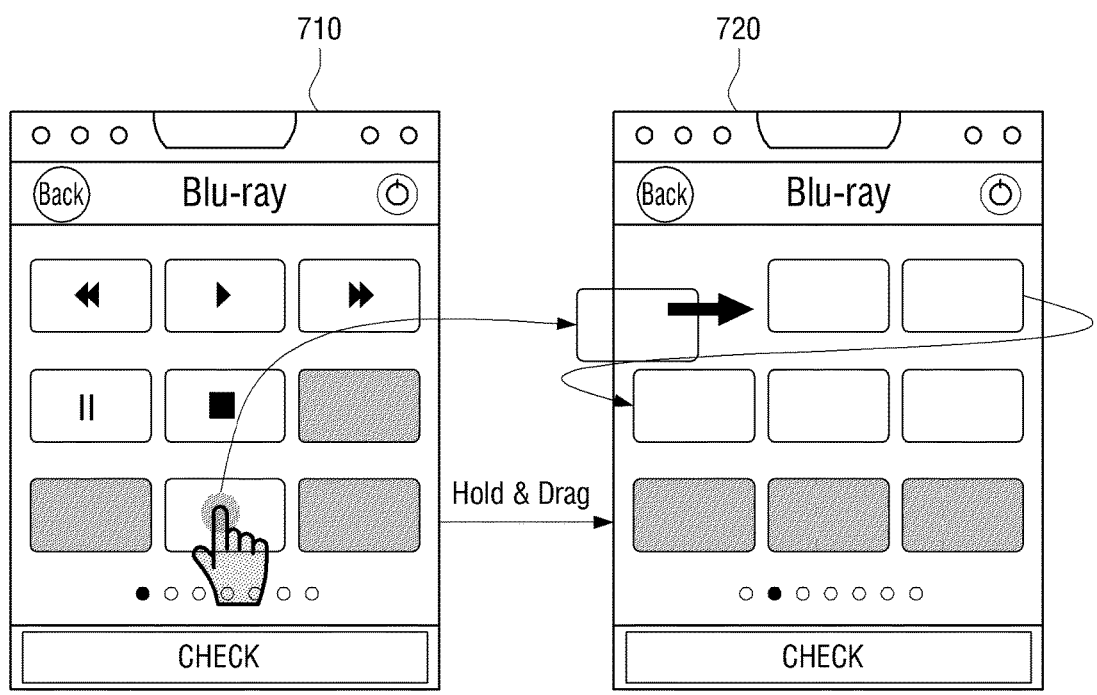
Figure 8:
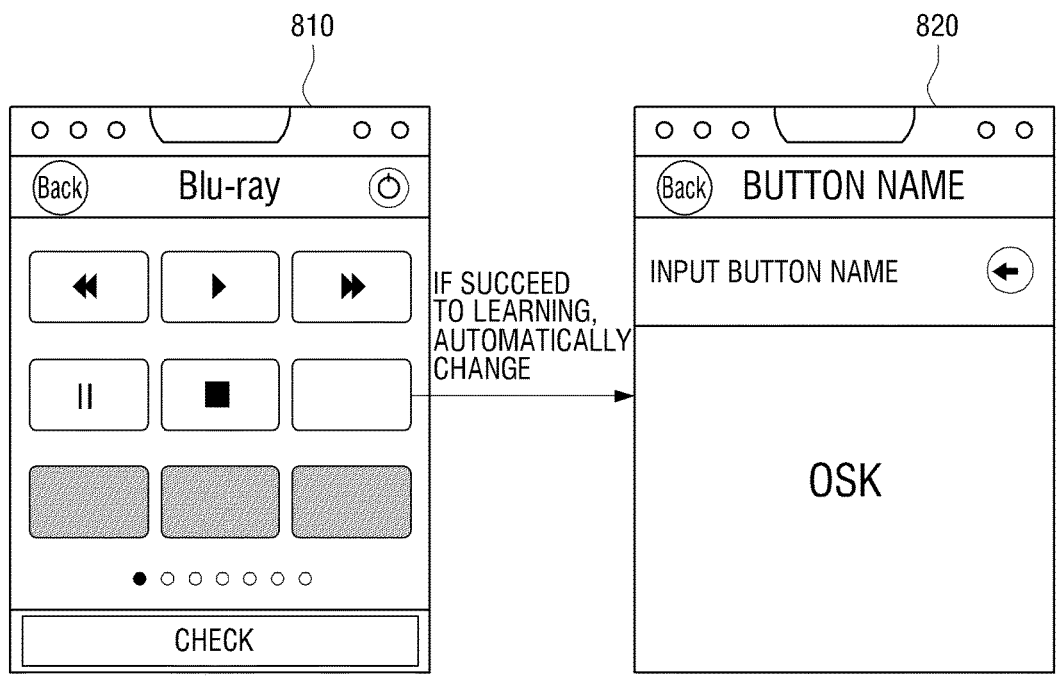

FIGS. 7 and 8 are views illustrating examples of a user interface window which receives an edit command for the previously stored user interface window.

Referring to FIG. 7, the user interface window 710 displays a user interface window corresponding to a new broadcast receiver (for example, Blu-ray). A user may move a specific icon of a plurality of displayed icons in order to change a layout of the displayed user interface window.

Referring to FIG. 8, the user interface window 810 displays a user interface window corresponding to the previously stored broadcast receiver. A user may select one of a plurality of icons and change a shape or a name of the selected icon, thereby editing the previously stored user interface window.

Figure 9:
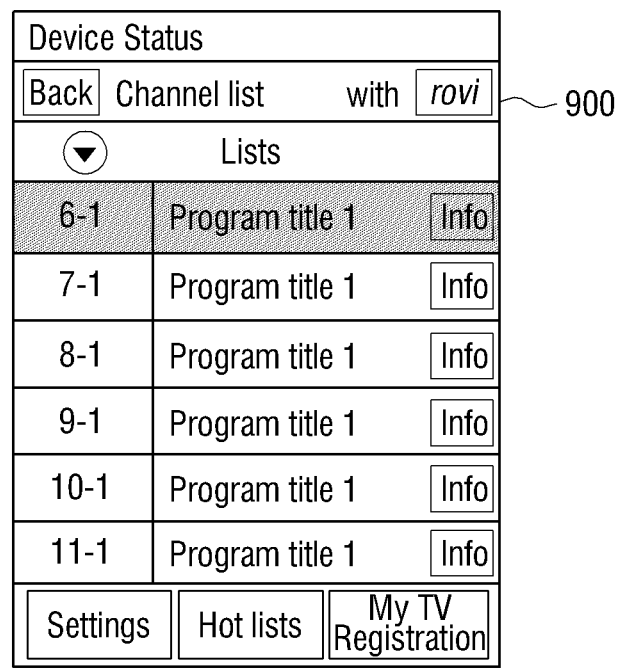
Figure 10:
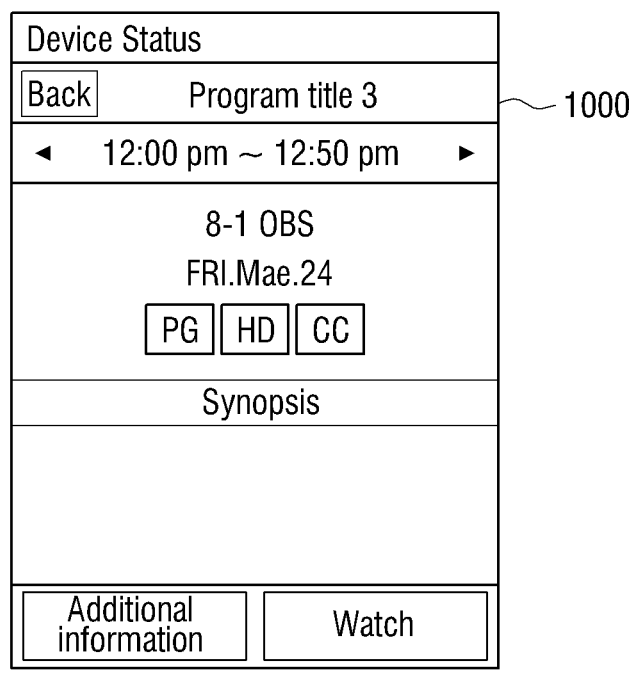

FIGS. 9 and 10 illustrate examples of a user interface window displaying menu information.

Referring to FIG. 9, the user interface window 900 displays channel information received from a broadcast receiver (for example, a TV). If a user selects a specific channel, the control device 100 may transmit an IR code so that the corresponding channel is selected using an IR code set for the corresponding broadcast receiver previously registered. For example, if a user selects a channel "6-1" through the user interface window, the control device 100 may sequentially transmit an IR code corresponding to "6", an IR code corresponding to "-", an IR code corresponding to "1" and an IR code corresponding to "enter" to the broadcast receiver.

If a user wants additional information for the corresponding channel, the user may select an "info" region. In this case, the control device 100 may displays a user interface window as shown in FIG. 10.

Referring to FIG. 10, the user interface window 1000 display EPG information for a specific channel. Specifically, the EPG information may be information received from a broadcast receiver (for example, a TV) which is currently displaying a broadcast, information received by the control device 100 from an external server, or information received from another broadcast receiver (for example, a STB) other than the broadcast receiver which is current displaying the broadcast.

If a user inputs a record command through the user interface window 1000, the control device 100 may sequentially transmit corresponding IR codes so that the channel corresponding to EPG information which is currently displaying on the corresponding broadcast receiver can be recorded.

As described above, the control device 100 according to the exemplary embodiment can display menu information received from a broadcast receiver as well as menu information received from a plurality of broadcast receivers or an external server, thereby improving user convenience.

FIG. 11 is a flow chart illustrating a method of controlling a broadcast receiver according to an exemplary embodiment.

First, information of a broadcast receiver controlled through unidirectional wireless communication is received (S1110). Specifically, a user interface window includes a first region for selecting and displaying a type or kind of broadcast receiver, a second region for selecting and displaying a manufacturer of the broadcast receiver and a third region for selecting and displaying a model name of the broadcast receiver. Additionally, the user interface window may be used for inputting information of a new broadcast receiver.

Thereafter, an IR code set corresponding to the new broadcast receiver based on the received information is searched (S1120). Specifically, the IR code set corresponding to the new broadcast receiver may be searched in an IR code set DB according to the received information. If the IR code set corresponding to the received information is not stored in the previously stored IR code set DB, the received information is transmitted to an external server and an IR code set corresponding to the new broadcast receiver is searched from the external server. Alternatively, an IR code set corresponding to the new broadcast receiver may be searched by performing a learning search.

A layout of the use interface window of the new broadcast interface is edited (S1130). Specifically, special icons for each of a plurality of control commands supported by the new broadcast receiver may be edited as well as positions or the like for each specific icon so that the layout of the user interface window for the new broadcast receiver can be edited.

The new broadcast receiver is registered as a controllable broadcast receiver within a home network based on the searched IR code set (S1140). Specifically, the information for the new broadcast receiver may be added to a DB in which "a broadcast receiver controllable by the control device 100", an IR code set for each broadcasting receiver, and information of a user interface window for each broadcasting receiver have been stored.

If a control command for the registered broadcast receiver is received (S1150), an IR code corresponding to the control command for the registered broadcast receiver is transmitted to the registered broadcast receiver (S1160).

Thereby, in the method of controlling a broadcast receiver according to an exemplary embodiment, an operation of registering a new broadcast receiver is performed by inputting simple information such as a kind, manufacturer and model name of a broadcast receiver which is to be added in the provided user interface window improving user convenience. The method of controlling the broadcast receiver as shown in FIG. 11 may be implemented on the control device having the configuration of FIG. 1 and on a control device having other configurations other than the configuration of FIG. 1.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A control device which controls a broadcast receiver, the control device comprising:
   a touch screen;
   a communication unit configured to communicate with an external device; and
   a processor configured to:
      display, on the touch screen, a user interface for registering the broadcast receiver, the user interface comprising a plurality of icons corresponding to the broadcast receiver,
      while registering the broadcast receiver through the user interface, edit the plurality of icons by adding at least one icon to the plurality of icons or deleting the at least one icon from the plurality of icons and changing at least one of a shape and a name of at least one icon among the plurality of icons according to a user edit command,
      receive a plurality of infrared (IR) codes for controlling the broadcast receiver from the external device,
      while registering the broadcast receiver through the user interface and after editing the plurality of icons, map each of the plurality of IR codes to the edited plurality of icons respectively, and
      in response to an IR code-mapped icon being selected, generate a control command corresponding to an IR code of the IR code-mapped icon.

2. The control device as claimed in claim 1, wherein the external device is a server, and
   wherein the processor is further configured to receive the IR code from the server via wireless network communication.

3. The control device as claimed in claim 1, wherein in response to the IR code-mapped icon which represents a particular function being selected, the processor is further configured to transmit the IR code corresponding to the IR code-mapped icon to the broadcast receiver.

4. The control device as claimed in claim 1, wherein the processor is further configured to, in response to one of the plurality of icons being held and dragged by the user edit command, change a location of the held icon according to the drag.

5. The control device as claimed in claim 4, wherein the processor is further configured to change an arrangement order for the plurality of icons according to the location of the held icon being changed.

6. The control device as claimed in claim 1, wherein the processor is further configured to edit the IR code of the IR code-mapped icon according to the user edit command.

7. The control device as claimed in claim 1, wherein the processor is further configured to set a user interface (UI) screen for controlling the broadcast receiver in response to an input of information of the broadcast receiver.

8. A control method of a control device which controls a broadcast receiver, the control method comprising:
   displaying a user interface for registering the broadcast receiver, the user interface comprising a plurality of icons corresponding to the broadcast receiver;
   while registering the broadcast receiver through the user interface, editing the plurality of icons by adding at least one icon to the plurality of icons or deleting the at least one icon from the plurality of icons and changing at least one of a shape and a name of at least one icon among the plurality of icons according to a user edit command;
   receiving a plurality of infrared (IR) codes for controlling the broadcast receiver from an external device;
   while registering the broadcast receiver through the user interface and after editing the plurality of icons, mapping each of the plurality of IR codes to the edited plurality of icons respectively; and
   in response to an IR code-mapped icon being selected, generating a control command corresponding to an IR code of the IR code-mapped icon.

9. The control method as claimed in claim 8, wherein the external device is a server and the receiving the plurality of IR codes comprises receiving the IR code from the server via wireless network communication.

10. The control method as claimed in claim 8, further comprising: in response to the IR code-mapped icon which represents a particular function being selected, transmitting the IR code corresponding to the IR code-mapped icon to the broadcast receiver.

11. The control method as claimed in claim 8, further comprising: in response to one of the plurality of icons being held and dragged by the user edit command, changing a location of the held icon according to the drag.

12. The control method as claimed in claim 8, further comprising: editing the IR code the IR code-mapped icon according to the user edit command.

13. The control method as claimed in claim 8, further comprising: setting a user interface (UI) screen for controlling the broadcast receiver in response to an input of information of the broadcast receiver.

14. A non-transitory computer readable medium configured to store instructions for controlling a control device which controls a broadcast receiver, the instructions comprising:
   displaying a user interface for registering the broadcast receiver, the user interface comprising a plurality of icons corresponding to the broadcast receiver;
   while registering the broadcast receiver through the user interface, editing the plurality of icons by adding at least one icon to the plurality of icons, deleting at least one icon from the plurality of icons and editing at least one of a shape and a name of at least one icon among the plurality of icons according to a user edit command,
   receiving a plurality of infrared (IR) codes for controlling the broadcast receiver from an external device;
   while registering the broadcast receiver through the user interface and after editing the plurality of icons, mapping each of the plurality of IR codes to the edited plurality of icons respectively; and
   in response to an IR code-mapped icon being selected, generating a control command corresponding to an IR code of the IR code-mapped icon.

15. The non-transitory computer readable medium of claim 14, wherein the external device is a server and the receiving the plurality of IR codes comprises receiving the IR code from the server via wireless network communication.

16. The non-transitory computer readable medium of claim 14, further comprising: in response to the IR code-mapped icon which represents a particular function being selected, transmitting the IR code corresponding to the IR code-mapped icon to the broadcast receiver.

17. The non-transitory computer readable medium of claim 14, further comprising: in response to one of the plurality of icons being held and dragged by the user edit command, changing a location of the held icon according to the drag.

18. The non-transitory computer readable medium of claim 14 further comprising: editing the IR code the IR code-mapped icon according to the user edit command.

* * * * *